United States Patent
Rosmeulen (10) Patent No.: US 9,826,184 B2
(45) Date of Patent: Nov. 21, 2017

(54) DEVICE FOR IMAGING AND METHOD FOR ACQUIRING A TIME DELAY AND INTEGRATION IMAGE

(71) Applicant: IMEC VZW, Leuven (BE)

(72) Inventor: Maarten Rosmeulen, Leuven (BE)

(73) Assignee: IMEC vzw, Leuven (BE)

( * ) Notice: Subject to any disclaimer, the term of this patent is extended or adjusted under 35 U.S.C. 154(b) by 45 days.

(21) Appl. No.: 15/182,020

(22) Filed: Jun. 14, 2016

(65) Prior Publication Data
US 2016/0373679 A1  Dec. 22, 2016

(30) Foreign Application Priority Data

Jun. 17, 2015 (EP) ..................................... 15172562

(51) Int. Cl.
*H04N 5/372* (2011.01)
*H04N 5/345* (2011.01)
(Continued)

(52) U.S. Cl.
CPC ......... *H04N 5/37206* (2013.01); *B64D 47/08* (2013.01); *G06T 7/20* (2013.01);
(Continued)

(58) Field of Classification Search
CPC .... H04N 5/37206; H04N 5/345; H04N 9/045; G06T 7/20; G06T 2207/30181; G06T 2207/10032; B64D 47/08; B64C 2201/127
See application file for complete search history.

(56) References Cited

U.S. PATENT DOCUMENTS 4,242,700 A  12/1980  Weimer
5,379,065 A   1/1995  Cutts
(Continued)

FOREIGN PATENT DOCUMENTS

EP        2 088 763 A2     8/2009
WO    WO 2003/106917 A2   12/2003

OTHER PUBLICATIONS

Extended European Search Report dated Oct. 30, 2015 for European Application No. 15172562.9 which corresponds in priority to above-identified subject U.S. application.

*Primary Examiner* — Mekonnen Dagnew
(74) *Attorney, Agent, or Firm* — Knobbe, Martens, Olson & Bear LLP (57) ABSTRACT

A device for imaging comprising an image sensor is disclosed. The image sensor includes rows and columns of pixels. The image sensor further includes a first control structure for controlling transfer of accumulated electric charges from photo-active regions to transmission regions in pixels. The image sensor further includes a second control structure for controlling transfer of accumulated charge in the transmission region of each row to the adjacent row below. The first and second control structures control the image sensor to alternately transfer accumulated charges in photo-active regions to the transmission regions and transfer charges to the adjacent row below. The control structure includes a plurality of row structures which are arranged to select whether the charge in the photo-active regions of respective rows are added to the transmission region. Each row of pixels is controlled by one of the row structures of the first control structure.

15 Claims, 9 Drawing Sheets

(51) Int. Cl.
*H04N 9/04* (2006.01)
*B64D 47/08* (2006.01)
*G06T 7/20* (2017.01)

(52) U.S. Cl.
CPC ............ *H04N 5/345* (2013.01); *H04N 9/045* (2013.01); *B64C 2201/127* (2013.01); *G06T 2207/10032* (2013.01); *G06T 2207/30181* (2013.01)

(56) References Cited

U.S. PATENT DOCUMENTS

| | | | |
|---|---|---|---|
| 5,926,215 A | 7/1999 | Whipple et al. | |
| 6,678,048 B1 | 1/2004 | Rienstra et al. | |
| 2006/0197949 A1 | 9/2006 | Bouzid et al. | |
| 2010/0007778 A1 | 1/2010 | Lim | |
| 2011/0317052 A1* | 12/2011 | Kieft | G01J 3/2803 348/295 |
| 2014/0061434 A1 | 3/2014 | Takahashi | |
| 2015/0002655 A1* | 1/2015 | Zheng | G01N 21/9501 348/87 |
| 2015/0136955 A1 | 5/2015 | Wein | |

* cited by examiner

DEVICE FOR IMAGING AND METHOD FOR ACQUIRING A TIME DELAY AND INTEGRATION IMAGE

RELATED APPLICATIONS

This application claims priority to European Application EP 15172562.9, entitled "DEVICE FOR IMAGING AND METHOD FOR ACQUIRING A TIME DELAY AND INTEGRATION IMAGE," filed on Jun. 17, 2015, and incorporated herein by reference in its entirety.

BACKGROUND

Field

The disclosed technology relates to a device and a method of acquiring an image. In particular, the image may be acquired using time delay and integration.

Description of the Related Technology

Time delay and integration (TDI) image sensing is a popular technique used for inspection of scenes with inherent linear motion such as in machine vision or earth observation. TDI image sensing may be particularly useful in light starved applications with low irradiance on the focal plane, typically a consequence of imaging faint objects and/or high speed imaging requirements, since integration of the low irradiance levels is allowed. In such circumstances, a good signal to noise ratio (SNR) in acquiring the image is important in order for the detected light not to be drowned by noise. A TDI sensor is therefore often implemented in charge-coupled device (CCD) technology, as this offers essentially noiseless signal integration in the charge domain.

In TDI image sensing it may often be of interest to record spectral content of the detected light for each imaged point of an object. A detector system may thus be provided with a dispersive element for splitting different wavelengths of the incoming light. Alternatively, different pixels on the image sensor may be associated with different filters in order to separate detection of different wavelengths. However, acquiring images with a high spectral and spatial resolution implies that a large amount of data needs to be gathered and a sensor system needs to be adapted to allowing gathering of data in three dimensions (two spatial dimensions and one spectral dimension).

This implies that substantial data rates are required and causes a high computational load in order to allow extraction of the information of interest from the gathered data.

Alternatively, a filter profile may be tuned to the needs of a particular application. However, this may be achieved by fixing the filter profile during a camera production process, making such types of cameras very inflexible and prohibitively expensive. Alternatively, a filter may be changed in front of an image sensor, but this would typically result in costly and/or bulky devices.

International Application WO 2003/106917 discloses a TDI technique. A two-dimensional focal plane array is divided into sub-arrays of rows and columns of pixels, each sub-array being responsive to light energy from a target object which has been separated by a spectral filter into a predetermined number of spectral bands. Each sub-array has its own read out channel to allow parallel and simultaneous readout of all sub-arrays of the array. However, this device is quite bulky and it takes a long time to acquire spectral information from a portion on the target object, since the portion needs to be moved over each sub-array of the array to acquire the spectral information.

U.S. Pat. No. 6,678,048 discloses a programmable optical filter for use in hyperspectral imaging using TDI is disclosed. The filter is used together with a complementary metal-oxide-semiconductor (CMOS) image sensor. A variable gain feature allows individual rows of pixels to be attenuated individually, such that a focal plane spectral processing of an image is provided. Thus, computational requirements in post-processing of the acquired image are greatly reduced. However, the system uses a CMOS image sensor, which implies that noise is added in each transfer of detected light onto the next row in the TDI array.

SUMMARY OF CERTAIN INVENTIVE ASPECTS

An objective of the invention is to provide a simple system which allows TDI imaging with spectral filtering, while maintaining a good SNR. Another objective of the invention is to improve on existing TDI imaging systems.

One aspect of the disclosed technology is a device for imaging. The device includes an image sensor arranged to acquire an image. The image sensor includes pixels which are arranged in columns and rows forming a plurality of adjacent rows over an area of the image sensor. Each pixel includes a photo-active region, which is arranged to accumulate an electric charge proportional to intensity of electromagnetic radiation incident on the photo-active region, and a transmission region, which is arranged to receive the accumulated electric charge from the photo-active region. The image sensor further includes a first control structure for controlling and timing transfer of accumulated electric charges from the photo-active regions to the transmission regions in pixels. The image sensor further includes a second control structure for controlling and timing the transfer of accumulated electric charge in the transmission region of each row of pixels to the adjacent row below. The first and second control structures are configured to control the image sensor to alternately transfer accumulated charges in photo-active regions to the transmission regions of pixels and transfer the accumulated electric charge in transmission regions from one row to the adjacent row below whereby electric charges accumulated in photo-active regions in a column of pixels are added to each other. Accumulated charges in a lower-most row of the image sensor are output to a read-out structure. The first control structure includes a plurality of row structures which are arranged to control whether the accumulated electric charge in the photo-active region of at least one row is to be output to the transmission region of the at least one row such that the row structures select whether the charge in the photo-active regions of respective rows are added to the accumulated electric charge in the transmission region. Each row of pixels is controlled by one of the row structures of the first control structure to control whether the accumulated electric charge in the photo-active region of the row is to be output to the transmission region of the row.

A second aspect of the disclosed technology is a method of acquiring a time delay and integration image by a device for imaging including an image sensor. The method includes accumulating electric charges proportional to intensity of electro-magnetic radiation incident on photo-active regions in pixels, which are arranged in columns and rows forming a plurality of adjacent rows over an area of the image sensor. The method further includes alternately transferring the accumulated electric charges from the photo-active regions to transmission regions of pixels and transferring the accumulated electric charge in transmission regions from one row to the adjacent row below, whereby electric charges accumulated in photo-active regions in a column of pixels are added to each other, and wherein accumulated charges in a lower-most row of the image sensor are output to a read-out structure. For each row, the method further includes controlling whether the accumulated electric charge in the photo-active region is to be added to the accumulated electric charge in the transmission regions in order to select whether the charge in the photo-active regions of the rows are added to the accumulated electric charge in the transmission regions.

The device and method according to the invention allows for TDI during imaging of an object. The accumulated electric charges may be successively moved from a row of pixels to the row below, where further exposure of the object can occur so as to perform integration. Thus, according to an embodiment of the method, the transferring of the accumulated electric charge in transmission regions one row to the adjacent row below is synchronized with movement of an object to be imaged in relation to the device.

There is further provided a possibility to individually select whether a row of pixels is to contribute to the accumulated electric charge. Thanks to the first control structure, it is possible to control whether the charge in the photo-active region for a row of pixels is to be output to the transmission region. This implies that a row-programmable functionality of the imaging may be achieved. Hence, the selection of which rows that are to contribute to the accumulated electric charge may be varied between different images and the device may be adapted for use in different applications with different requirements simply by means of changing the row-programming.

Further, thanks to the electric charges being moved within the area of the image sensor, there is essentially noiseless addition of charges to each other.

As used herein, the term "device for imaging" may not necessarily include all elements that may be required for forming an image of an object onto photo-active regions. The "device for imaging" may include imaging optics and/or filters controlling electromagnetic radiation that is passed to the image sensor. However, the "device for imaging" may also be construed as to relate only to circuitry that captures an image of electro-magnetic radiation incident on photo-active regions. In such case, the "device for imaging" may be constituted of the image sensor.

A device according to the first aspect of the invention may be used for selecting rows for which the charge in the photo-active regions is to be added to the accumulated electric charge based on, for example, a part of an object that is presently imaged onto the row or on lighting conditions applying to the object. Thus, a line in the object plane which contains uninteresting or misguiding information (for example, a line that is obscured by an overhanging object) may be blackened by no charges being added to the accumulated electric charge when the line in the object plane is imaged onto the respective row of pixels. Further, the device may be synchronized with a flash light, which may cause reflections in the object that may disguise information of interest in the object, such that accumulated electric charges gathered during the flash light exposure of the object are not added to the accumulated electric charge.

According to an embodiment, the device further includes an optical element, which is aligned with rows of pixels and arranged to selectively pass different wavelengths of electro-magnetic radiation to different rows of pixels. This implies that each row of pixels is associated with a specific wavelength or range of wavelengths of electro-magnetic radiation. Thus, by means of selecting whether a row of pixels is to contribute to the accumulated electric charge, a spectral content of the acquired electro-magnetic radiation may be controlled. Hereby, the device may be programmed to include the wavelengths that are of current interest in imaging of an object, and the device may be adapted to different applications where different programming may be needed.

The device allows selecting the wavelengths of electro-magnetic radiation that are to contribute to the accumulated electric charges. However, the individual contribution from each selected wavelength may not be determined. Thus, the simplicity and programmability of the device may be provided at a cost of not being able to separate between the accumulated electric charges for each selected wavelength. However, it is realized that for many applications, such separation of the spectral content of accumulated charges may not be necessary. Further, thanks to the programmability of the device, the device is not bulky even though a possibility of changing spectral filtration is provided. Also, the device may output the desired spectral information such that post-processing of the acquired information for extracting specific spectral information may not be necessary.

According to an embodiment, the optical element is integrated with the image sensor. The optical element may thus include bandpass filters, such as dichroic filters, which may be arranged on top of respective rows of pixels. However, it should be realized that the optical element may be implemented in a number of other ways, such as by means of a dispersive element which passes different wavelengths of electro-magnetic radiation to different rows of pixels, such that when an object is imaged onto a row of pixels, a specific wavelength of electro-magnetic radiation is detected.

According to an embodiment of the method, the controlling for each row is programmable to adjust settings of which rows that are selected to add the charge in the photo-active regions to the accumulated electric charge in the transmission regions. Thus, the adjusted settings may be adapted to requirements of the application of TDI imaging.

According to an embodiment, the method further includes receiving parameters for programming said controlling for each row. Thus, parameters may be provided by an external unit and, in particular, by a user that wants to adapt the method of controlling the imaging method.

According to an embodiment of the device, the first and second control structures are arranged to control transfer of accumulated electric charges such that a non-selected row which is controlled to not add electric charges accumulated in photo-active regions to the transmission regions is arranged to transfer the accumulated electric charges from the rows above the non-selected row to the row below the non-selected row. This implies that the accumulated electric charges may be further transferred down the rows of the device regardless whether a row is selected to contribute to the accumulated electric charges. Thus, any combination of rows may be selected to contribute to the accumulated electric charges.

According to another embodiment, the device further includes an overflow drain connected to the photo-active regions in a column of pixels, and the first control structure is arranged to control accumulated electric charges in a photo-active region not selected to add to the accumulated electric charge in the transmission region to be output to the overflow drain. Thus, if a row of pixels is not to contribute to the accumulated electric charge in the transmission region, the electric charge in the photo-active region may be drained so as not to interfere with later exposures of objects on the row of pixels.

According to an alternative embodiment, each pixel may include a further transmission region, the first control structure is arranged to control accumulated electric charges in a photo-active region not selected to add to the accumulated electric charge in the transmission region to be output to the further transmission region, and the second control structure controls accumulated electric charge in the further transmission region of each row of pixels to be transferred to the further transmission region in the adjacent row below. This implies that the accumulated electric charges of each row will be either output to the transmission region or the further transmission region such that the rows that contribute to the accumulated electric charges in the transmission region are an inverse to the rows that contribute to the accumulated electric charges in the further transmission region. For instance, if the device is combined with an optical element, the transmission region and the further transmission region may hold inverse spectral information.

According to an embodiment, each row structure of the plurality of row structures of the first control structure is arranged to control whether the accumulated electric charge in the photo-active region of one row is to be output to the transmission region of said one row. This implies that each row of pixels is individually controlled.

According to an alternative embodiment, each row structure of the plurality of row structures of the first control structure may simultaneously control a plurality of rows of pixels. This may be useful, for example, when several adjacent rows are arranged to receive the same wavelength of electro-magnetic radiation. Thus, a single row structure may be provided to control whether a specific wavelength should contribute to the accumulated electric charges.

According to another embodiment, the device further comprises a control circuitry for clocking and controlling signals on the first and second control structure, wherein the control circuitry includes an input for controlling at least the signals to the first control structure. Thus, the selection of which rows of pixels should contribute to the accumulated electric charges may be controlled by providing an input to control circuitry.

A third aspect of the disclosed technology is an apparatus for inspection of a moving object. The apparatus includes device for imaging according to the first aspect, and a processing unit, which is arranged to receive an image from the image sensor of the device and arranged to process the received image in order analyze the moving object.

As discussed with regard to the first aspect of the invention, the device allows selecting which rows of pixels contribute to the accumulated electric charge, which is detected in the image. Hence, the processing unit may receive an image providing a selected spectral content. The processing unit may thus be able to quickly analyze the moving object, since the selected spectral content may include only information relevant for the analysis.

According to an embodiment, the device for imaging is mounted in relation to the moving object such that the moving object will be sequentially imaged onto different rows of the image sensor. Hence, no adjustment, such as changing the field of view, of the device for imaging may be necessary in order to acquire the desired image.

In one embodiment, the device for imaging is mounted in an aircraft such that the earth below the aircraft may be imaged and the apparatus may be used for earth observation.

BRIEF DESCRIPTION OF THE DRAWINGS

The above, as well as additional objects, features and advantages of the present inventive concept, will be better understood through the following illustrative and non-limiting detailed description of embodiments of the disclosed technology, with reference to the appended drawings. In the drawings like reference numerals will be used for like elements unless stated otherwise.

DETAILED DESCRIPTION OF CERTAIN EMBODIMENTS

Detailed embodiments of the disclosed technology will now be described with reference to the drawings.

Figure 1:
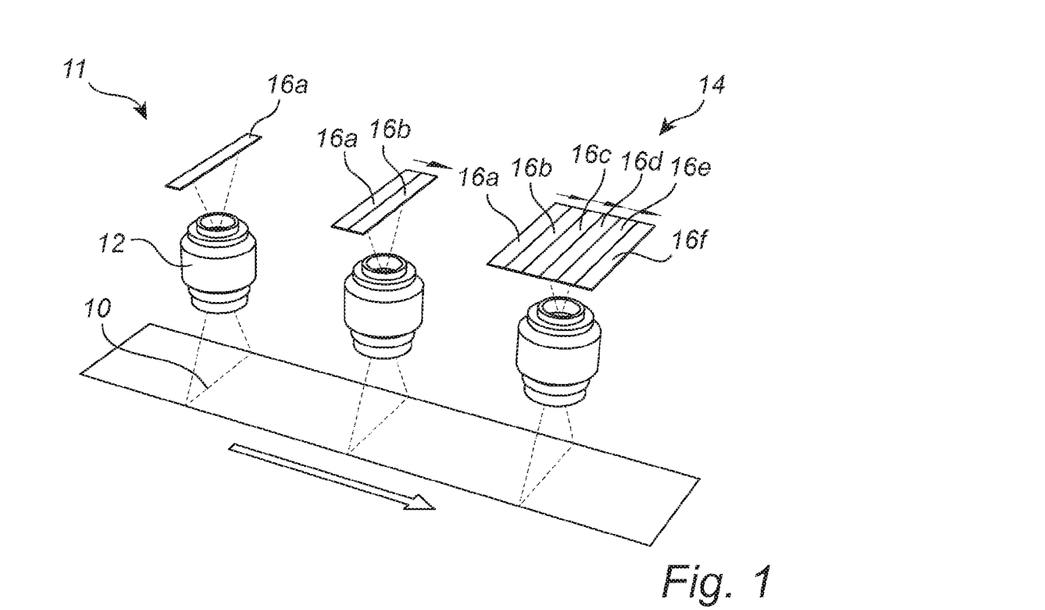
FIG. 1 is a schematic view illustrating TDI imaging.

Referring to FIG. 1, a principle of TDI imaging will first be described. An object 10 is imaged by a device for imaging 11, which comprises an optical system 12 and an image sensor 14, wherein the optical system 12 forms an image of the object 10 onto the image sensor 14. The object 10 moves in relation to the image sensor 14, wherein the movement may be due to the object 10 moving, the device for imaging 11 or the image sensor 14 moving or both the object 10 and the image sensor 14 moving. For instance, the image sensor 14 may be arranged in an aircraft (for example, an airplane, a helicopter, or a drone) in flight and ground below the aircraft may be imaged onto the image sensor 14, or a stationary image sensor 14 may be arranged to image objects 10 on a moving conveyor belt.

During a first exposure period, a part of the object 10 is imaged onto a first row of pixels 16a on the image sensor 14. During exposure, an electric charge is accumulated in proportion to an intensity of incident light in the first row of pixels 16a. The accumulated charge is then transferred to a second row of pixels 16b. Simultaneously, the object 10 moves in relation to the image sensor 14 such that the part of the object 10 is now imaged onto the second row of pixels 16b in a second exposure period. The accumulated charges in the second row of pixels 16b during the second exposure period may thus be added to the accumulated charges received from the first row of pixels 16a. This procedure may be repeated while the object 10 is imaged on a plurality of rows of pixels 16a-f such that integration of accumulated charges from a plurality of rows of pixels 16a-f occurs, providing a long exposure time for imaging of the object 10. This principle may for instance be of interest in light-starved applications, where integration allows a signal of interest to be detectable over noise levels.

Figure 2:
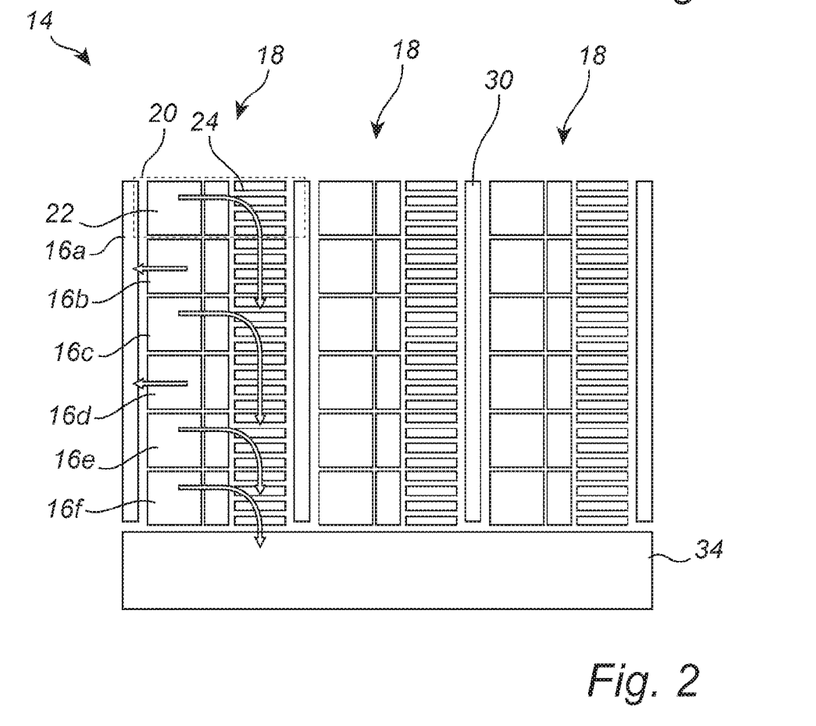
FIG. 2 is a schematic view of an image sensor illustrating flow of electric charges according to an embodiment of the invention.

Referring now to FIG. 2, an image sensor 14 will be generally described. FIG. 2 also illustrates an exemplary flow of electric charges, which may suitably be used in TDI imaging. The image sensor 14 comprises an imaging area, which is divided into pixels 20 that are arranged in columns 18 and rows 16a-f.

Each pixel 20 comprises a photo-active region 22. The photo-active region 22 may be arranged to create an electric charge when electro-magnetic radiation is incident on the photo-active region 22. The electric charge may be created in proportion to an intensity of incident electro-magnetic radiation. Thus, an electric charge may be accumulated that is proportional to the intensity of incident electro-magnetic radiation during an exposure period.

The photo-active region 22 may e.g. be implemented as a photogate, wherein the photo-active region 22 is connected to a control line. A voltage-induced potential well may then be formed in the photo-active region 22 to store the electric charge created by the incident electro-magnetic radiation. According to one alternative, the photo-active region 22 may be implemented as a photodiode, wherein ions are implanted in a substrate of the image sensor 14 to create potential wells that can store the electric charge created by the incident electro-magnetic radiation.

The pixel 20 may further comprise a transmission region 24. The photo-active region 22 and the transmission region 24 may be so arranged that, when a trigger signal is received, the accumulated electric charge in the photo-active region 22 is transferred to the transmission region 24.

The transmission region 24 may be overlaid by an absorbing or reflecting material in order to prevent electro-magnetic radiation to be received by the transmission regions 24 and thereby almost entirely prevent electric charges to be created in the transmission region 24. For instance, the image sensor 14 may be provided with opaque stripes covering the transmission regions 24.

According to an alternative embodiment, dopant implantations may be formed in the transmission regions 24 such that a potential barrier is created in the transmission regions 24. This implies that electric charges created by incident electro-magnetic radiation are repelled and almost entirely prevented from being collected in the transmission regions 24.

Figure 3A:
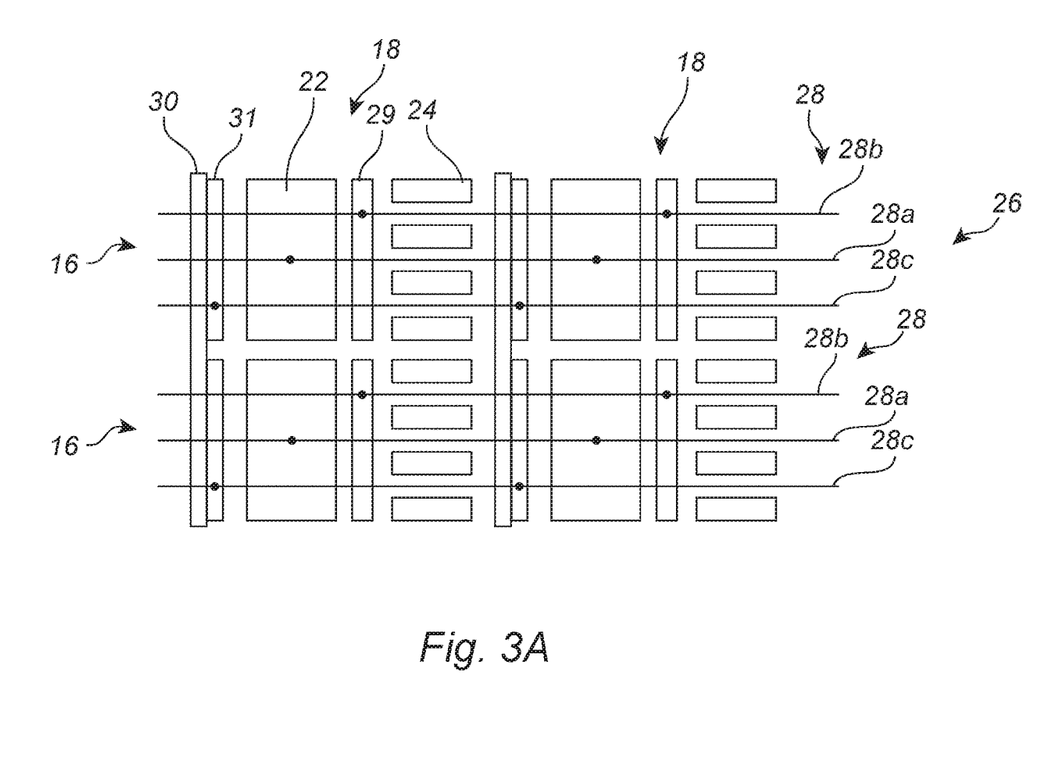
FIG. 3A is a schematic view of an image sensor illustrating a first control structure according to a first embodiment of the invention.
Figure 3B:
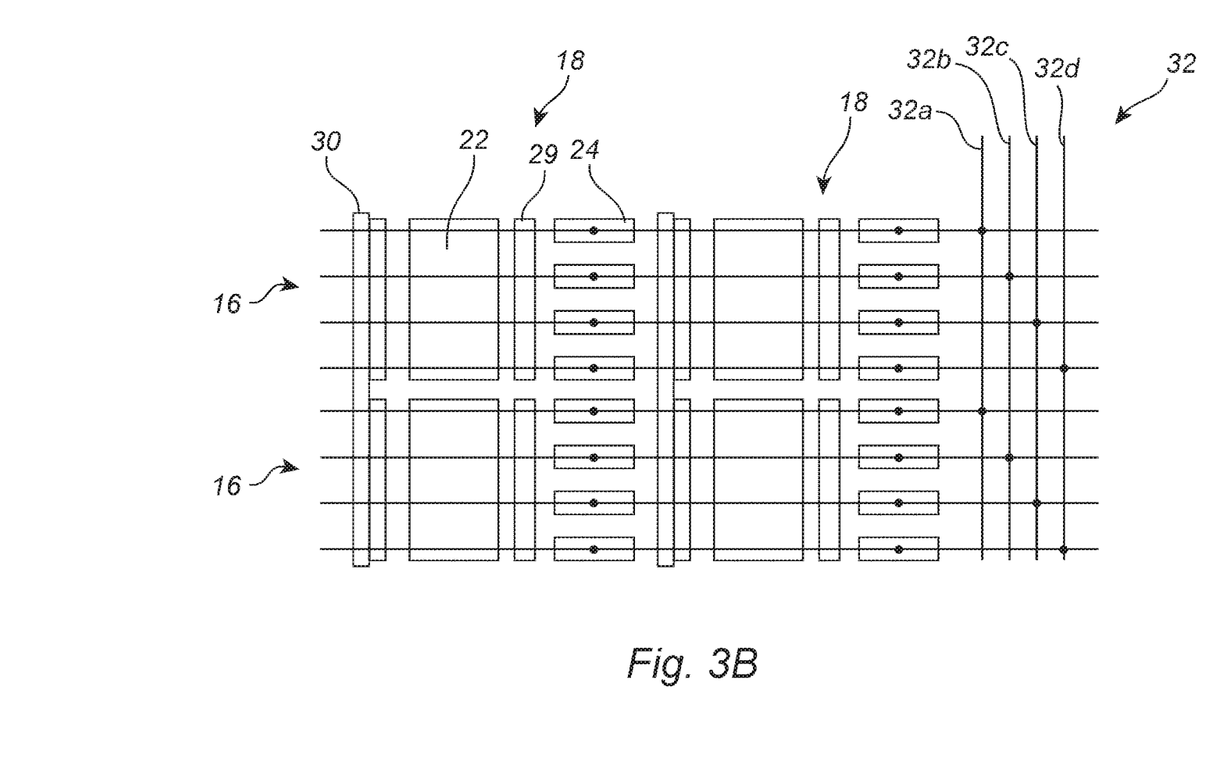
FIG. 3B is a schematic view of an image sensor illustrating a second control structure according to the first embodiment of the invention.

Referring now to FIGS. 3A and 3B, control of transfer of electric charges in the image sensor 14 will be explained in relation to an embodiment of the image sensor 14 wherein the photo-active regions 22 are formed as photogates. Only a few pixels 20 are shown in order to illustrate the transfer of electric charges. It should be realized that the image sensor 14 may comprise a large number of pixels 20.

FIG. 3A only illustrates a first control structure 26, whereas FIG. 3B only illustrates a second control structure 32 in order to make the figures more clear. It should be realized that the image sensor 14 according to the embodiment comprises both the first and the second control structure.

The image sensor 14 may further comprise a first control structure 26 as illustrated in FIG. 3A. The first control structure 26 comprises a plurality of row structures 28, which are arranged to control the transfer of accumulated electric charges from the photo-active regions 22 to the transmission regions 24 in pixels 20. The row structure 28 may comprise a photogate control line 28a, which may control the potential well in the photo-active region 22 in order to control when electric charges can be accumulated in the photo-active region 22. The row structure 28 may further comprise a transfer control line 28b, which may be connected to a transfer gate 29 between the photo-active region 22 and the transmission region 24. Signals provided on the photogate control line 28a and the transfer control line 28b may trigger the transfer of accumulated electric charges from the photo-active region 22 to the transmission region 24.

The signals provided on the plurality of row structures 28 may be individually controlled. This implies that a selection is possible, whether the accumulated electric charges in an individual photo-active region 22 are to be transferred and added to a total electric charge in the corresponding transmission region 24.

A row of pixels 20 may be controlled by one row structure 28 such that a signal provided by the row structure 28 will cause the transfer of the accumulated charges in the photo-active regions 22 in the row to be transferred to the transmission regions 24. The plurality of row structures 28 will thus together form a row-programmable image sensor 14, wherein each row 16a-f of pixels may be selected whether to contribute to the accumulated electric charges.

The image sensor 14 may further comprise overflow drains 30, such that accumulated electric charges that are not to be added to the charges in the transmission regions 24 may instead be transferred to an overflow drain 30. This implies that the accumulated electric charge will not interfere with a subsequent exposure of an object onto the pixel 20. Overflow gates 31 may be provided between the photo-active region 22 and the overflow drain 30. The row structure 28 may further comprise an overflow control line 28c, which is connected to the overflow gate 31 in order to trigger the accumulated electric charges in the pixels 20 that are not selected to contribute to the added charges in the transmission regions 24 to instead be transferred to the overflow drains 30.

The image sensor 14 may further comprise a second control structure 32 as illustrated in FIG. 3B. The second control structure 32 is connected to columns of transmission regions 24. The second control structure 32 is arranged to provide signals so as to trigger transfer of accumulated electric charges down the columns of transmission regions 24. The transmission regions 24 may form charge shift registers. The trigger signal from the second control structure 32 may thus control the accumulated electric charges in each transmission region to be shifted down one row.

In FIG. 3B, a four-phase shift register is shown, wherein four control lines 32a-d are provided and each is connected to a respective section in a register. All transmission regions 24 may be connected to the same control lines 32a-d such that the transfer of electric charges through the transmission regions 24 may be simultaneously controlled. It should be realized that other types of shift registers may be provided, such as one-, two-, or three-phase shift registers. The control of the phase-shift registers will not be further explained herein as the implementation is known to a person skilled in the art. The control lines 32a-d are illustrated in FIG. 3B as extending horizontally along the rows 16 of the image sensor 14. It should be realized that the control lines 32*a-d* may alternatively extend vertically along the columns 18 of the image sensor 14.

Referring again to FIG. 2, a trajectory of electric charges is indicated by arrows. Signals may alternately be provided by the first control structure 26 and the second control structure 32 so as to alternately transfer accumulated charges in photo-active regions 22 to the transmission regions 24 of pixels 20 and transfer, i.e. shift, the accumulated electric charge in transmission regions 24 one row to the adjacent row below whereby electric charges accumulated in selected photo-active regions 22 in a column 18 of pixels 20 are added to each other.

At a bottom row 16*f* of the image sensor 14, the accumulated electric charges are output to a read-out structure 34. The read-out structure 34 receives accumulated electric charges for a number of columns 18, wherein each column 18 may thus provide information of imaging of a point on an object 10 using an integrated exposure time as the point has been sequentially imaged onto the different rows 16*a-f* of the image sensor 14. The read-out structure 34 may handle the information from each column 18 separately so as to maintain a spatial resolution in the imaging of the object 10.

The read-out structure 34 may be arranged to convert the accumulated electric charges to voltages. The read-out structure 34 may further comprise an analog-to-digital converter (ADC) for converting the voltages to digital information facilitating storing and transfer of information acquired by the image sensor 14. Alternatively, the image sensor 14 outputs voltages and ADC may be provided on a separate unit that is connected to the image sensor 14.

The optical system 12 may be arranged to control diversion of wavelengths of electro-magnetic radiation such that different wavelengths are passed onto different rows 16*a-f* of the image sensor 14, such that when an object is imaged onto a row of pixels, a specific wavelength of electro-magnetic radiation is detected at the row. For instance, the optical system 12 may comprise a dispersive element. Alternatively, optical filters may be provided in correspondence with the rows 16*a-f* or may even be integrated with the image sensor 14.

Each row 16*a-f* of the image sensor 14 may thus be arranged to receive a narrow range of selected wavelengths of electro-magnetic radiation. The different rows 16*a-f* may thus provide spectral information of an imaged object 10 and may together e.g. receive electro-magnetic radiation from the entire visible spectrum or even extending into ultra-violet radiation or infra-red radiation.

The row-programmable feature provided by the first control structure 26 thus allows selection of which wavelengths that are to contribute to the accumulated electric charges that are collected in each column 18 of the image sensor 14. Inclusion or exclusion of a row 16*a-f* of pixels may be easily controlled by means of the signals provided on the corresponding row structure 28 of the first control structure 26. This implies that the spectral information that is collected may be dynamically controlled and selected dependent on a specific situation. Hence, the image sensor 14 may be flexibly used and adapted to many different types of applications.

The accumulated electric charges of the selected wavelengths are then added to each other to give a total amount of received electro-magnetic radiation for the combination of selected wavelengths. The spectral information may e.g. be used for determining whether a material is present in the object 10.

It should be realized that the image sensor in FIG. 2 only shows six rows 16*a-f* in order to illustrate a principle of how electric charges are transferred. A skilled person immediately understands that any number of rows may be used.

Figure 4:
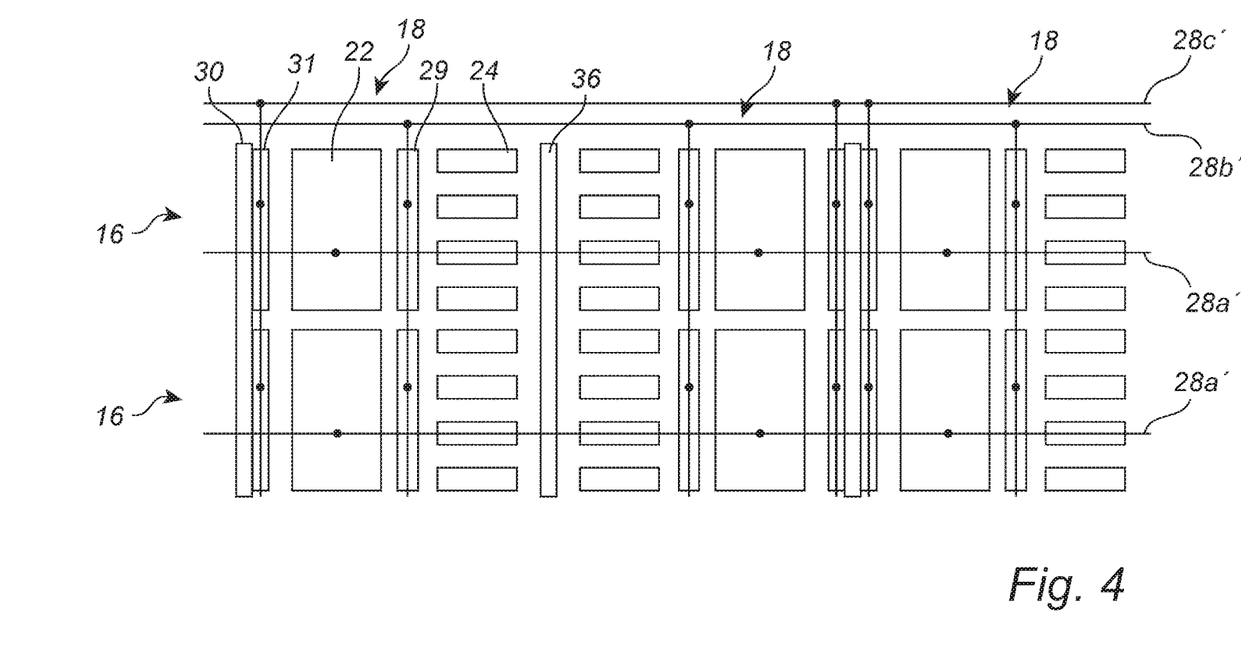
FIG. 4 is a schematic view of an image sensor according to a second embodiment of the invention.

According to an embodiment as illustrated in FIG. 4, every other column 18 may have a differently arranged structure, such that in comparison to the structure illustrated in FIGS. 2 and 3, the transmission regions 24 are to the left of the photo-active regions 22 instead of to the right. This implies that the overflow drain 30 may be shared by two adjacent columns 18 and that the columns 18 are mirrored around the overflow drain 30. However, the transmission regions 24 of two adjacent columns 18 will then be arranged adjacent to each other. Thus, there is also arranged a stop or isolation 36 between the adjacent transmission regions 24 to prevent electric charges to be transferred between adjacent columns 18. Such a stop 36 may also be needed in the embodiment of FIGS. 2-3, but is not illustrated there for simplicity.

According to an embodiment as also illustrated in FIG. 4, the first control structure 26 may comprise transfer control lines 28*b*' that are shared by all pixels 20 and therefore not individually controlled for each row 16. Also, or alternatively, as illustrated in FIG. 4, the first control structure 26 may comprise overflow control lines 28*c*' that are shared by all pixels 20 and therefore not individually controlled for each row 16.

The row structure may thus only comprise a photogate control line 28*a*' which controls whether electric charge is accumulated in the photo-active region 22 of a row 16. The first control structure 26 further comprises globally controlled lines for controlling transfer of electric charges to the transmission region 24 or the overflow drain 30. The row-programmability of the image sensor 14 may thus be achieved, as further explained below with reference to FIG. 6, by means of the photogate control line 28*a*', while transfer of electric charges may be commonly controlled for the plurality of rows 16.

It should be realized that this embodiment of the first control structure 26, although illustrated in FIG. 4 together with columns 18 that are mirrored around the overflow drain 30, may be similarly implemented in the embodiment illustrated in FIGS. 2-3.

Figure 5:
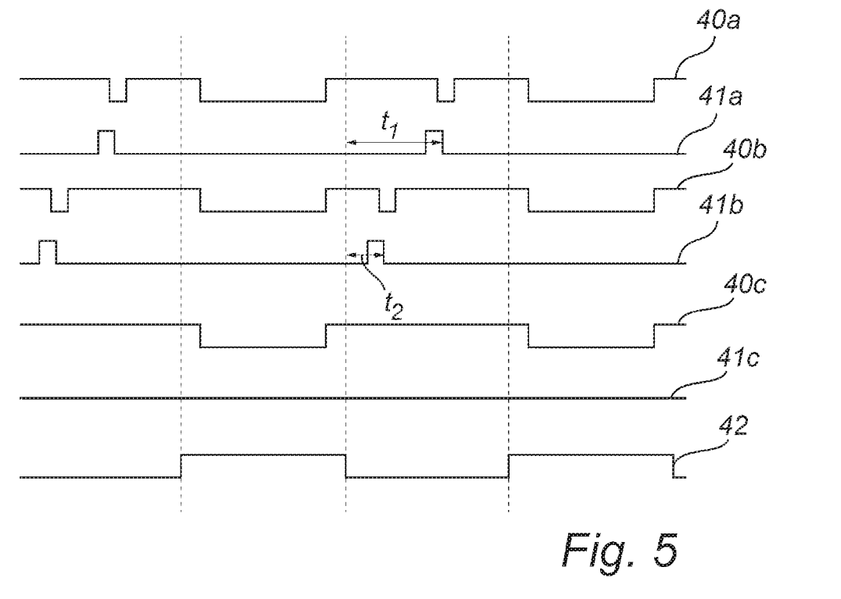
FIG. 5 is a schematic view illustrating control signals according to the first embodiment of the invention.

Referring now to FIG. 5, an example of signals transmitted for controlling the transfer of charges on the image sensor 14 according to the embodiment shown in FIGS. 3A and 3B is shown in order to further explain how charges are transferred.

In FIG. 5, signals 40*a-c* provided on the photogate control line 28*a* of three different row structures 28 of the first control structure 26 are shown. Also, signals 41*a-c* provided on the corresponding transfer control line 28*b* of the three row structures 28 are shown. Further, a signal 42 provided on the overflow control line 28*c* for controlling transfer of charges to overflow drains 30 is shown. There will also be signals provided by the second control structure 32 for shifting charges down one row on the image sensor 14, but these are not illustrated in FIG. 5.

The signals 40-42 are shown as having a high and a low value, illustrating an activating and a non-activating state. In an n-type metal-oxide semiconductor (nMOS), activation of a gate would indeed involve applying a positive or high voltage, whereas in a p-type metal-oxide semiconductor (pMOS), activation of a gate would involve applying a negative or low voltage, As shown in FIG. 5, the signal 42 on the overflow control line 28*c* is non-activating during a first time period allowing electric charges to be collected and accumulated in the photo-active regions 22. Then, the signal 42 is activating during a second time period in order to control electric charges to be transferred from the photo-active regions 22 to the overflow drains 30. In the example shown in FIG. 5, The signal 42 is common to all rows 16 or is synchronized for all overflow control lines 28c.

During the second time period, any remaining electric charge in the photo-active regions 22 are drained to the overflow drains 30 so as to not interfere with detection of incident electro-magnetic radiation in an upcoming collection of electric charges. During the second time period, signals on the second control structure 32 will be activating to cause charges in the transmission regions 24 to be shifted down one row 16.

The row structures 28 of the first control structure 26 are separately controllable in order to provide different signals 40a-c and 41a-c to different rows 16a-f of pixels 20. As illustrated in FIG. 5, the signal 40c on a photogate control line 28a may be activating during the first time period to allow creation of electric charges in the photo-active region 22 and non-activating during the second time period when the remaining electric charges are drained to the overflow drain 30. Further, the signal 41c on a transfer control line 28b may be constantly non-activating, which implies that no accumulated electric charges from the corresponding row 16c of pixels will be added to the charges in the transmission region 24. Rather, when the signal 42 is activating, the accumulated electric charges are transferred to the overflow drains 30. Further, for such a row 16c, when the electric charges in the transmission region 24 are shifted down, the electric charges accumulated from previous rows 16a-b are simply forwarded to the row 16c below without any contribution being provided from the photo-active regions 22 of the row 16b.

The signals 40a-b are also activating during the first time period. After the accumulated electric charges have been transferred to the overflow drains 30, an exposure period during the first time period begins. In row 16a receiving the signal 40a, electric charges are accumulated during an exposure period having a length of time $t_1$. The signal 40a activates the photo-active region 22 to allow electric charges to be accumulated. A signal 41a on the transfer control line 28b provides a pulse to trigger transfer of the accumulated electric charges to the transmission region 24. The signal 40a is changed to be non-activating when the electric charge is to be transferred in order to allow electric charges to move from the photo-active region 22 to the transmission region 24. The signal 40a is activating during a large portion of the first time period before the pulse on the signal 41a of the transfer control line 28b is provided, which implies that a long exposure period is used in the row 40a. In row 16b receiving the signal 40b, the exposure period having a length of time $t_2$ is defined by a pulse provided by the signal 40b. The time $t_2$ is shorter than the time $t_1$ causing a limited exposure time to be used for the row 16b. After transfer of the accumulated electric charges in the photo-active regions 22 of rows 16a and 16b to the transmission region 24, further electric charges will be accumulated in the photo-active regions 22. These further electric charges will be transferred to the overflow drains 30 when the signal 42 is activating during the second time period.

Thus, by the individual control of the signals 40a-c and 41a-c provided by the row structures 28 of the first control structure 26, the rows 16 that are to contribute to the collected information and the exposure time for each row 16 may be individually selected.

Figure 6:
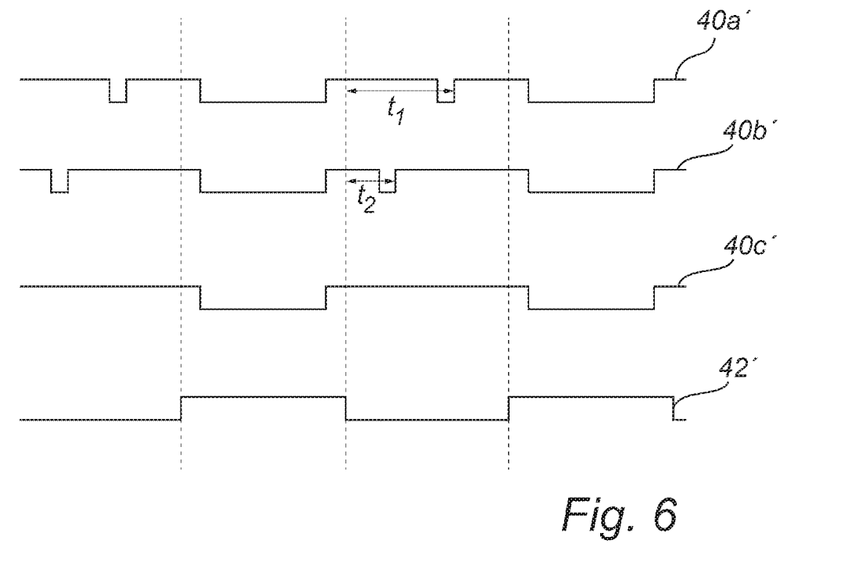
FIG. 6 is a schematic view illustrating control signals according to the second embodiment of the invention.

Referring now to FIG. 6, an example of signals transmitted for controlling the transfer of charges on the image sensor 14 according to the embodiment shown in FIG. 4 is shown.

Similarly to the embodiment shown in FIG. 5, the signal 42' on the overflow control line 28c' is non-activating and activating to define a first time period allowing electric charges to be accumulated and a second time period during which electric charges are transferred from the photo-active regions 22 to the overflow drains 30.

Although not shown in FIG. 6, the signal on the transfer control line 28b' shared by all pixels 20 of the image sensor 14 may be held at a constant bias that is selected to prevent electric charges accumulated in the photo-active region 22 to flow into the transmission region 24 when the signal on the photogate control line 28a' is activating but allows the electric charges to flow into the transmission region 24 when the signal on the photogate control line 28a' is non-activating.

The row structures 28 of the first control structure 26 are separately controllable in order to provide different signals 40a'-c' to different rows 16a-f of pixels 20. As illustrated in FIG. 6, the signal 40c' on a photogate control line 28a' may be activating during the entire first time period, whereby the electric charges accumulated in the photo-active region 22 are prevented from being transferred to the transmission region 24. Thus, no accumulated electric charges from the corresponding row 16c of pixels will be added to the charges in the transmission region 24. Rather, when the signal 42' is activating, the accumulated electric charges are transferred to the overflow drains 30.

The signals 40a'-b' are also activating during the first time period to allow electric charges to be accumulated. In row 16a, an exposure time $t_1$ is defined by the signal 40a' being turned to be non-activating during the first time period to allow electric charges to be transferred to the transmission region 24. Similarly, the signal 40b controlling row 16b is turned to be non-activating during the first time period defining an exposure time $t_2$.

It should be realized that several other schedules of signals are possible for individually controlling whether a row 16 will contribute to the accumulated electric charges in the transmission regions 24 and the exposure time applied to the row 16. For instance, a signal on photogate control lines 28a' may shift to be activating at different points of time. Then, the signal on the transfer control lines 28b' may be synchronized for all rows 16 and the exposure time for each row 16 is given by a time at which the photogate control line 28a' was activated.

According to another alternative, the signal 42 on the overflow control lines 28c may be activating or non-activating at different points of time for different rows 16 in order to control exposure time for the row 16 and whether the row 16 is to contribute to the accumulated electric charges in the transmission regions 24.

However, as illustrated in FIGS. 5 and 6, the signal 42 may be common for all rows 16. With such a signal schedule, it is possible to arrange an overflow gate 31 which is common for all pixels 20 within a column 18.

Figure 7:
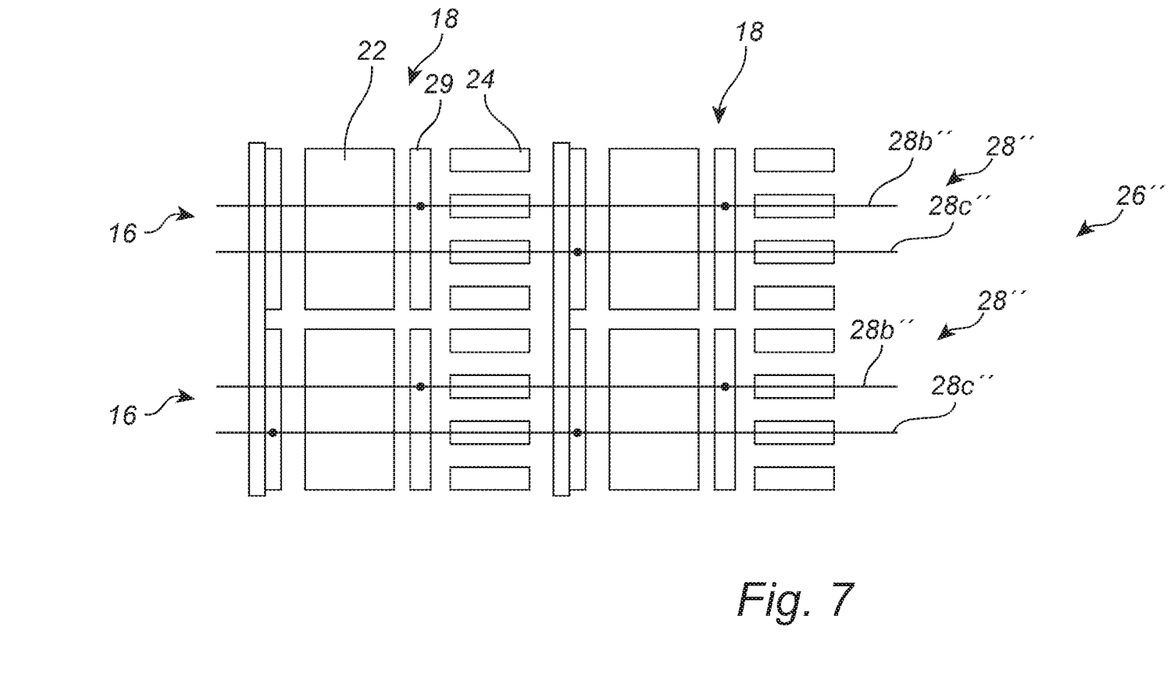
FIG. 7 is a schematic view of an image sensor according to a third embodiment of the invention.

Referring now to FIG. 7, control of transfer of electric charges in the image sensor 14 will be explained in relation to an embodiment of the image sensor 14 wherein the photo-active regions 22 are formed as photodiodes.

Here, the photo-active regions 22 are constantly creating electric charges based on incident electro-magnetic radiation and no control line is necessary to activate the collection of electric charges. The first control structure 26" comprises a plurality of row structures 28", which are arranged to control the transfer of accumulated electric charges from the photo-active regions 22 to the transmission regions 24 in pixels 20. The row structure 28" may comprise a transfer control line 28b", which may be connected to a transfer gate 29 between the photo-active region 22 and the transmission region 24. The first control structure 26" may further comprise an overflow control line 28c", which is connected to the overflow gate 31 and which may trigger electric charges to be transferred to the overflow drain 30.

Signals provided on the transfer control line 28b" may trigger the transfer of accumulated electric charges from the photo-active region 22 to the transmission region 24 and may be individually controlled for each row 16.

Figure 8:
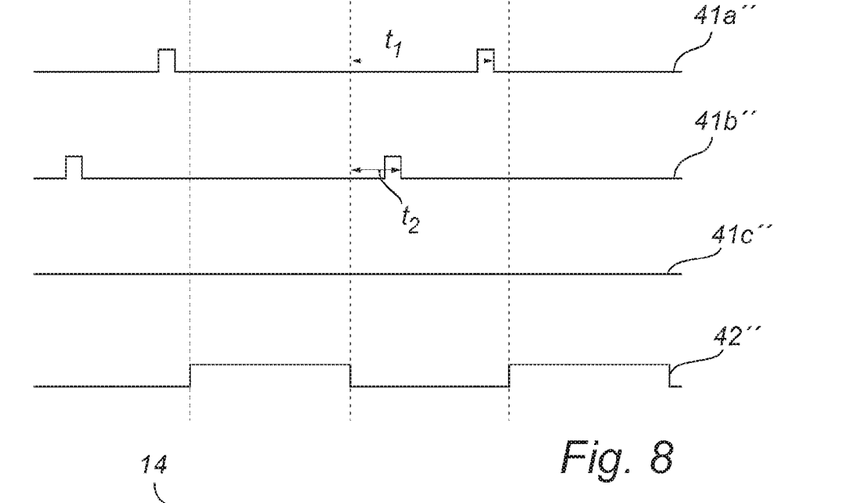
FIG. 8 is a schematic view illustrating control signals according to the third embodiment of the invention.

Referring now to FIG. 8, an example of signals transmitted for controlling the transfer of charges on the image sensor 14 according to the embodiment shown in FIG. 7 is shown.

The signal 42" on the overflow control line 28c" is non-activating to define a first time period allowing electric charges to be accumulated, and activating to define a second time period during which electric charges are transferred from the photo-active regions 22 to the overflow drains 30.

The row structures 28" of the first control structure 26" are separately controllable in order to provide different signals 41a"-c" to different rows 16a-f of pixels 20. As illustrated in FIG. 8, the signal 41c" on a transfer control line 28b" may be constantly non-activating, whereby the electric charges accumulated in the photo-active region 22 are prevented from being transferred to the transmission region 24. Thus, no accumulated electric charges from the corresponding row 16c of pixels will be added to the charges in the transmission region 24. Rather, when the signal 42" is activating, the accumulated electric charges are transferred to the overflow drains 30.

The signals 41a"-b" provide an activating pulse during the first time period to allow electric charges accumulated in the photo-active region 22 to be transferred to the transmission region 24. The timing of the activating pulse may define an exposure time $t_1$ and an exposure time $t_2$ of the rows 16a-b.

Figure 9:
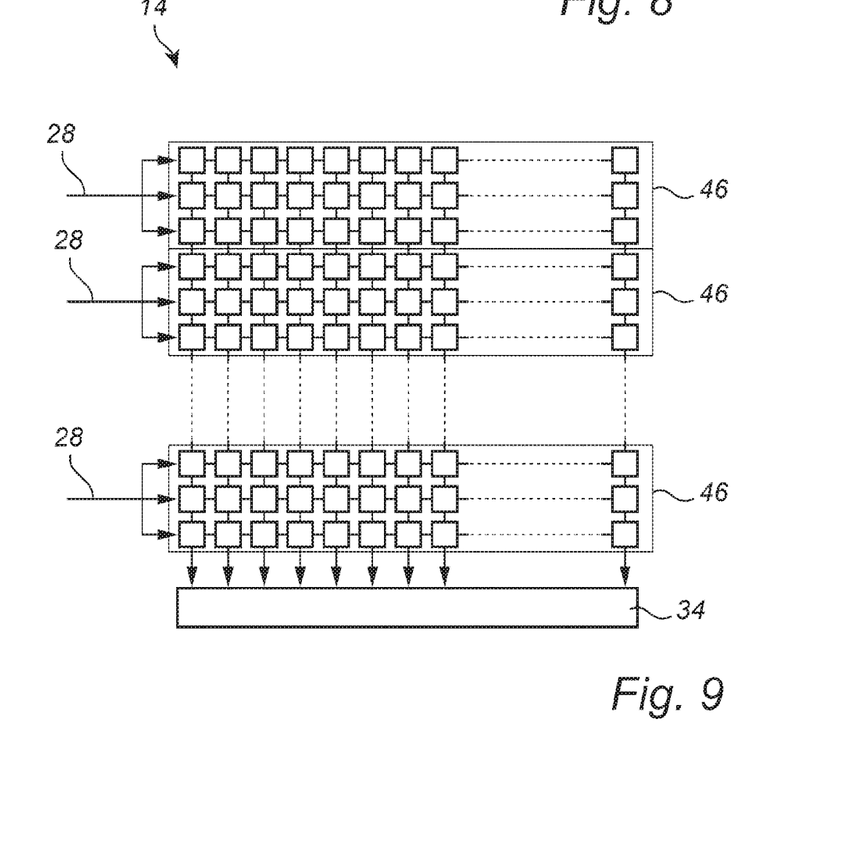
FIG. 9 is a schematic view of an image sensor according to another embodiment of the invention.

Referring now to FIG. 9, an optical bandpass filter 46 may be arranged to extend over a plurality of rows 16 on the image sensor 14. This implies that integration is allowed for electro-magnetic radiation within the bandpass wavelengths as an object 10 is sequentially imaged onto the rows 16 under the same optical bandpass filter 46. As shown in FIG. 9, a single row structure 28 of the first control structure 26 may thus affect a plurality of rows 16 on the image sensor 14, such that the rows 16 corresponding to each optical bandpass filter 46 may be commonly controlled.

It should however be realized that the plurality of rows 16 under the same optical bandpass filter 46 may still be individually controlled.

Figure 10:
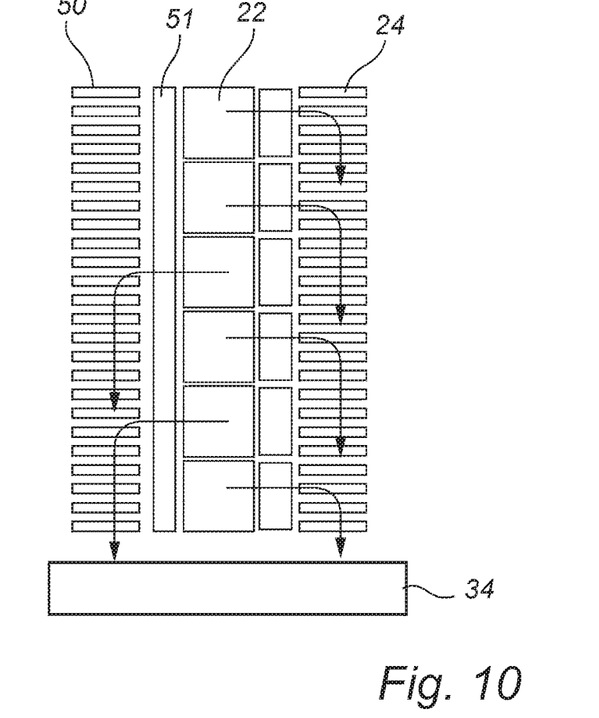
FIG. 10 is a schematic view of an image sensor according to yet another embodiment of the invention.

According to an alternative embodiment illustrated in FIG. 10, the overflow drains 30 may be replaced by a further transmission region 50. Thus, each pixel 20 comprises a further transmission region 50, such that the accumulated electric charges that are not transferred to the transmission region 24 will instead be transferred to the further transmission region 50. The further transmission region 50 may thus hold accumulated electric charges representing the non-selected rows 16. For instance, where the image sensor 14 is combined with an optical filter, the transmission region 24 and the further transmission region 50 may hold inverse spectral information.

As illustrated in FIG. 10, a common transfer gate 51 may connect the photo-active regions 22 to the further transmission region 24. However, separate transfer gates could alternatively be provided.

Figure 11:
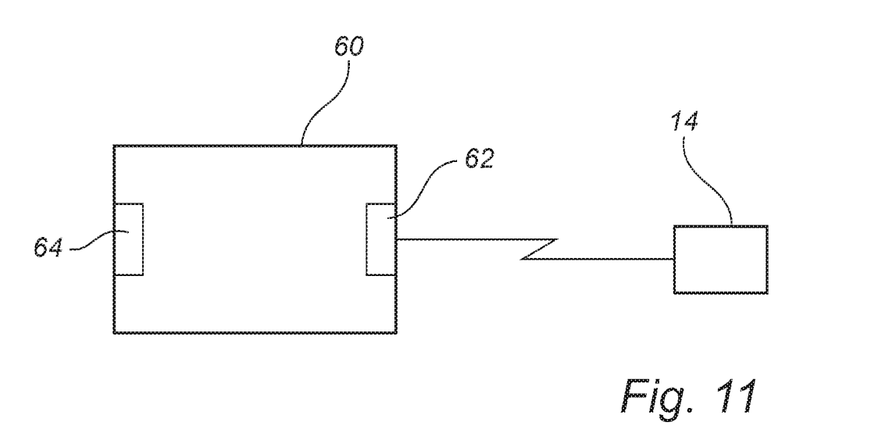
FIG. 11 is a schematic view illustrating control of the image sensor.

Referring now to FIG. 11, the image sensor 14 may be connected to control circuitry 60 for controlling the functionality of the image sensor 14. The control circuitry 60 may be provided on a separate integrated circuit (IC) or may be embedded in a common IC with the image sensor 14. The control circuitry 60 may comprise a clock for timing of the signals 40-42. Further, the control circuitry 60 may have an output 62 that is connected to the first control structure 26 and the second control structure 32 for outputting the signals by the structures. The control circuitry 60 may provide an interface 64 for providing input so as to control the row-programming of the image sensor 14. Such input may be provided as settings instructions that are stored in the control circuitry 60 and loaded into a processor unit of the control circuitry 60 when powering up the control circuitry 60.

Figure 12:
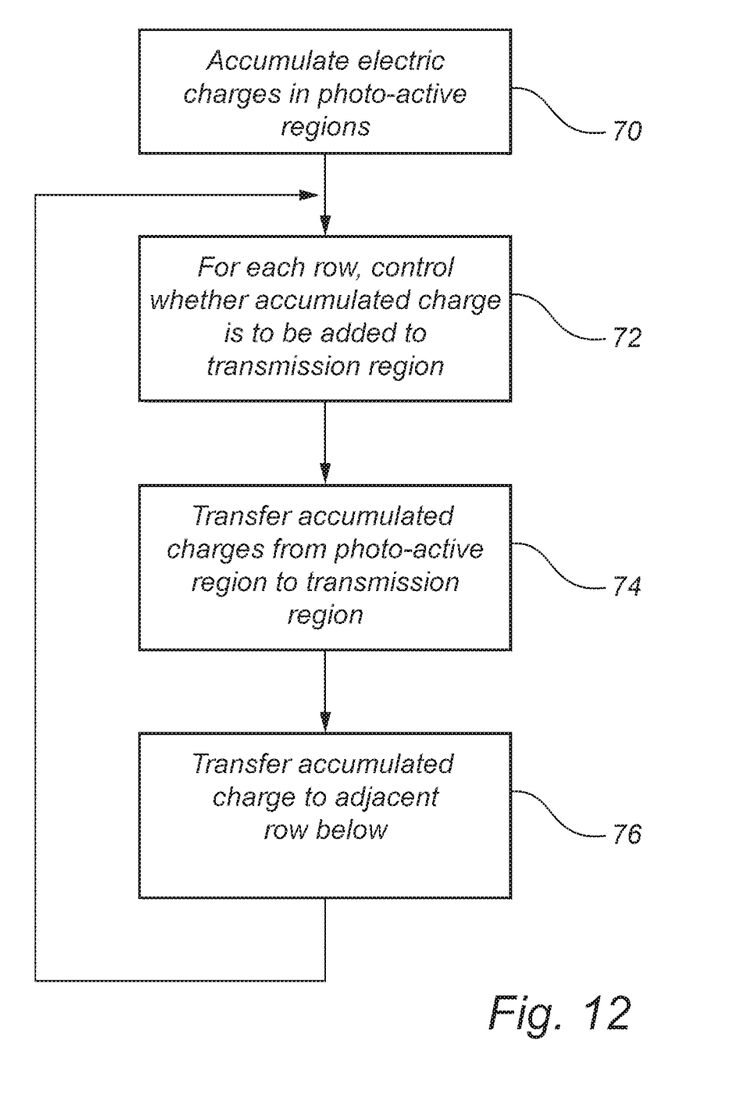
FIG. 12 is a flow chart of a method according to an embodiment of the invention.

Referring now to FIG. 12, a method according to an embodiment will be described. The method acquires a time delay and integration image from a device and comprises accumulating 70 electric charges proportional to intensity of electro-magnetic radiation incident on photo-active regions in pixels. The method comprises, for each row, controlling 72 whether the accumulated electric charge in the photo-active region is to be added to accumulated electric charge in corresponding transmission regions in order to select whether the charge in the photo-active regions of the rows are added to the accumulated electric charge in the transmission regions. The method further comprises alternately transferring 74 the accumulated electric charges from the photo-active regions to transmission regions of pixels for selected rows and transferring 76 the accumulated electric charge in transmission regions one row to the adjacent row below, whereby electric charges accumulated in photo-active regions in a column of pixels are added to each other.

The device for imaging 11 as described above may suitably be arranged in an apparatus for inspection of the moving object 10. The acquired image may thus be transmitted from the image sensor 14 to a processing unit. The processing unit may thus receive only information of interest, since the row-programming may be used to select contributing rows 16, which may e.g. correspond to the relevant wavelengths of electro-magnetic radiation. The processing unit may use the received image to analyze the moving object 10. For instance, the processing unit may quickly determine whether a specific material or substance is present in the moving object 10 based on the received amount of electro-magnetic radiation of specific wavelengths. Such an apparatus for inspection of moving objects 10 may be utilized in a number of different applications, such as earth observation from an aircraft or inspection of objects 10 on a moving conveyor belt in a manufacturing process.

In the above the invention has mainly been described with reference to a limited number of embodiments. However, as is readily appreciated by a person skilled in the art, other embodiments than the ones disclosed above are equally possible within the scope of the invention, as defined by the appended claims.

For instance, the description above is made in relation to TDI imaging. Thus, the embodiments described may e.g. be advantageously used in line scan optical systems, in machine vision applications, such as industrial inspection, or in earth observation, wherein spectral information may be useful. However, it should be realized that the image sensor 14 may also be used for other purposes. For instance, if it is desired that a specific part of an object or an imaged scene should not contribute to the imaging (e.g. a part of the object that is obscured by an overhanging object), such specific parts of the imaging may be removed by simply ensuring that the rows 16 onto which the undesired part of the object is imaged do not contribute to the accumulated electric charges in the transmission region 24. Further, the signals 40-42 may be synchronized with a flash light, which may cause reflections in the object that may disguise information of interest in the object, such that accumulated electric charges gathered during the flash light exposure of the object are not added to the accumulated electric charge.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be connected to the processor such that the processor can read information from, and write information to, the storage medium. In the alternative, the storage medium may be integral to the processor. The processor and the storage medium may reside in an ASIC.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently, rather than sequentially.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope. Thus, the present invention is not intended to be limited to the examples shown herein but is to be accorded the widest scope consistent with the principles and novel features disclosed herein.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

What is claimed is:

1. A device for imaging, comprising:
an image sensor, arranged to acquire an image, the image sensor comprising:
pixels, arranged in columns and rows forming a plurality of adjacent rows over an area of the image sensor, wherein each pixel comprises a photo-active region, which is arranged to accumulate an electric charge proportional to intensity of electro-magnetic radiation incident on the photo-active region, and a transmission region, which is arranged to receive the accumulated electric charge from the photo-active region;
a first control structure for controlling and timing transfer of accumulated electric charges from the photo-active regions to the transmission regions in pixels; and
a second control structure for controlling and timing transfer of accumulated electric charge in the transmission region of each row of pixels to the adjacent row below, wherein the first and second control structures are configured to control the image sensor to alternately transfer accumulated charges in photo-active regions to the transmission regions of pixels and transfer the accumulated electric charge in transmission regions from one row to the adjacent row below whereby electric charges accumulated in photo-active regions in a column of pixels are added to each other, and wherein accumulated charges in a lower-most row of the image sensor are output to a read-out structure;

wherein the first control structure comprises a plurality of row structures which are arranged to control whether the accumulated electric charge in the photo-active region of at least one row is to be output to the transmission region of the at least one row such that the row structures select whether the charge in the photo-active regions of respective rows are added to the accumulated electric charge in the transmission region, and wherein each row of pixels is controlled by one of the row structures of the first control structure to control whether the accumulated electric charge in the photo-active region of the row is to be output to the transmission region of the row.

2. The device of claim 1, wherein the first and second control structures are arranged to control transfer of accumulated electric charges such that a non-selected row which is controlled not to add electric charges accumulated in photo-active regions to the transmission regions is arranged to transfer the accumulated electric charges from the rows above the non-selected row to the row below the non-selected row.

3. The device of claim 1, further comprising an overflow drain connected to the photo-active regions in a column of pixels, and wherein the first control structure is arranged to control accumulated electric charges in a photo-active region not selected to add to the accumulated electric charge in the transmission region to be output to the overflow drain.

4. The device of claim 1, wherein each pixel comprises a further transmission region, and wherein the first control structure is arranged to control accumulated electric charges in a photo-active region not selected to add to the accumulated electric charge in the transmission region to be output to the further transmission region, and wherein the second control structure controls accumulated electric charge in the further transmission region of each row of pixels to be transferred to the further transmission region in the adjacent row below.

5. The device of claim 1, further comprising an optical element, which is aligned with rows of pixels and arranged to selectively pass different wavelengths of electro-magnetic radiation to different rows of pixels.

6. The device of claim 5, wherein the optical element is integrated with the image sensor.

7. The device of claim 1, wherein each row structure of the plurality of row structures of the first control structure is arranged to control whether the accumulated electric charge in the photo-active region of one row is to be output to the transmission region of said one row.

8. The device of claim 1, further comprising a control circuitry for clocking and controlling signals on the first and second control structure, wherein the control circuitry comprises an input for controlling at least the signals to the first control structure.

9. A method of acquiring a time delay and integration image by a device for imaging comprising an image sensor, the method comprising:

accumulating electric charges proportional to intensity of electro-magnetic radiation incident on photo-active regions in pixels, which are arranged in columns and rows forming a plurality of adjacent rows over an area of the image sensor;

alternately transferring the accumulated electric charges from the photo-active regions to transmission regions of pixels and transferring the accumulated electric charge in transmission regions from one row to the adjacent row below whereby electric charges accumulated in photo-active regions in a column of pixels are added to each other, and wherein accumulated charges in a lower-most row of the image sensor are output to a read-out structure;

for each row, controlling whether the accumulated electric charge in the photo-active region is to be added to the accumulated electric charge in the transmission regions in order to select whether the charge in the photo-active regions of the rows are added to the accumulated electric charge in the transmission regions.

10. The method of claim 9, wherein the controlling for each row is programmable to adjust settings of which rows that are selected to add the charge in the photo-active regions to the accumulated electric charge in the transmission regions.

11. The method of claim 10, further comprising receiving parameters for programming said controlling for each row.

12. The method of claim 9, wherein said transferring of the accumulated electric charge in transmission regions one row to the adjacent row below is synchronized with movement of an object to be imaged in relation to the image sensor.

13. An apparatus for inspection of a moving object, comprising
the device for imaging according to claim 1; and
a processing unit, which is arranged to receive an image from the image sensor of the device and arranged to process the received image in order analyze the moving object.

14. The apparatus of claim 13, wherein the device for imaging is mounted in relation to the moving object such that the moving object will be sequentially imaged onto different rows of the image sensor.

15. The apparatus of claim 13, wherein the device for imaging is mounted in an aircraft for earth observation.

* * * * *